United States Patent [19]

Soled et al.

[11] Patent Number: 5,254,518

[45] Date of Patent: Oct. 19, 1993

[54] GROUP IVB OXIDE ADDITION TO NOBLE METAL ON RARE EARTH MODIFIED SILICA ALUMINA AS HYDROCARBON CONVERSION CATALYST

[75] Inventors: Stuart L. Soled, Pittstown; Gary B. McVicker, Califon; William E. Gates, Somerville; Sabato Miseo, Pittstown, all of N.J.

[73] Assignee: Exxon Research & Engineering Company, Florham Park, N.J.

[21] Appl. No.: 916,759

[22] Filed: Jul. 22, 1992

[51] Int. Cl.$^5$ .......................... B01J 23/12; B01J 23/16
[52] U.S. Cl. ..................................... 502/241; 502/242; 502/261; 502/263
[58] Field of Search ............... 502/241, 242, 262, 263, 502/261

[56] References Cited

U.S. PATENT DOCUMENTS

| | | | |
|---|---|---|---|
| 2,968,632 | 1/1961 | Folkins et al. | 502/262 |
| 2,976,232 | 3/1961 | Porter, Jr. et al. | 208/138 |
| 3,002,921 | 10/1961 | Gladrow et al. | 208/138 |
| 3,223,617 | 12/1965 | Maziuk | 208/138 |
| 3,247,099 | 4/1966 | Oleck et al. | 208/138 |
| 3,649,524 | 3/1972 | Derr et al. | 208/139 |
| 3,684,742 | 8/1972 | Pollitzer | 502/262 |
| 3,776,860 | 12/1973 | Rai | 252/455 R |
| 4,024,077 | 5/1977 | Engelhard et al. | 252/442 |
| 4,039,477 | 8/1977 | Engelhard et al. | 252/441 |
| 4,227,993 | 10/1980 | Engelhard et al. | 208/139 |
| 4,624,940 | 11/1986 | Wan et al. | 502/262 |

FOREIGN PATENT DOCUMENTS 1243366 10/1968 United Kingdom .
1390625 11/1971 United Kingdom .

OTHER PUBLICATIONS

Sinfelt, J. H., Bifunctional Catalysis, Academic Press 1964, vol. 5 pp. 37-74, *Advances in Chemical Engineering*.

*Primary Examiner*—Carl F. Dees
*Attorney, Agent, or Firm*—Estelle C. Bakun

[57] ABSTRACT

By this invention there is provided a catalyst composition comprising a Group IVB oxide, an amorphous silica-alumina support having dispersed thereon a rare earth oxide, which as herein used also includes yttrium oxide, and a metal(s) selected from the group consisting of Group VIII noble metal(s), mixtures of Group VIII noble metal(s) and tin, mixtures of Group VIII noble metal(s) and rhenium, and mixtures of Group VIII noble metal(s), tin and rhenium. The amorphous silica-alumina support contains at least about 50% silica by weight. The catalyst can function as a hydrocarbon conversion catalyst in reactions where platinum on halided (Cl,F)-alumina is typically used.

10 Claims, 4 Drawing Sheets

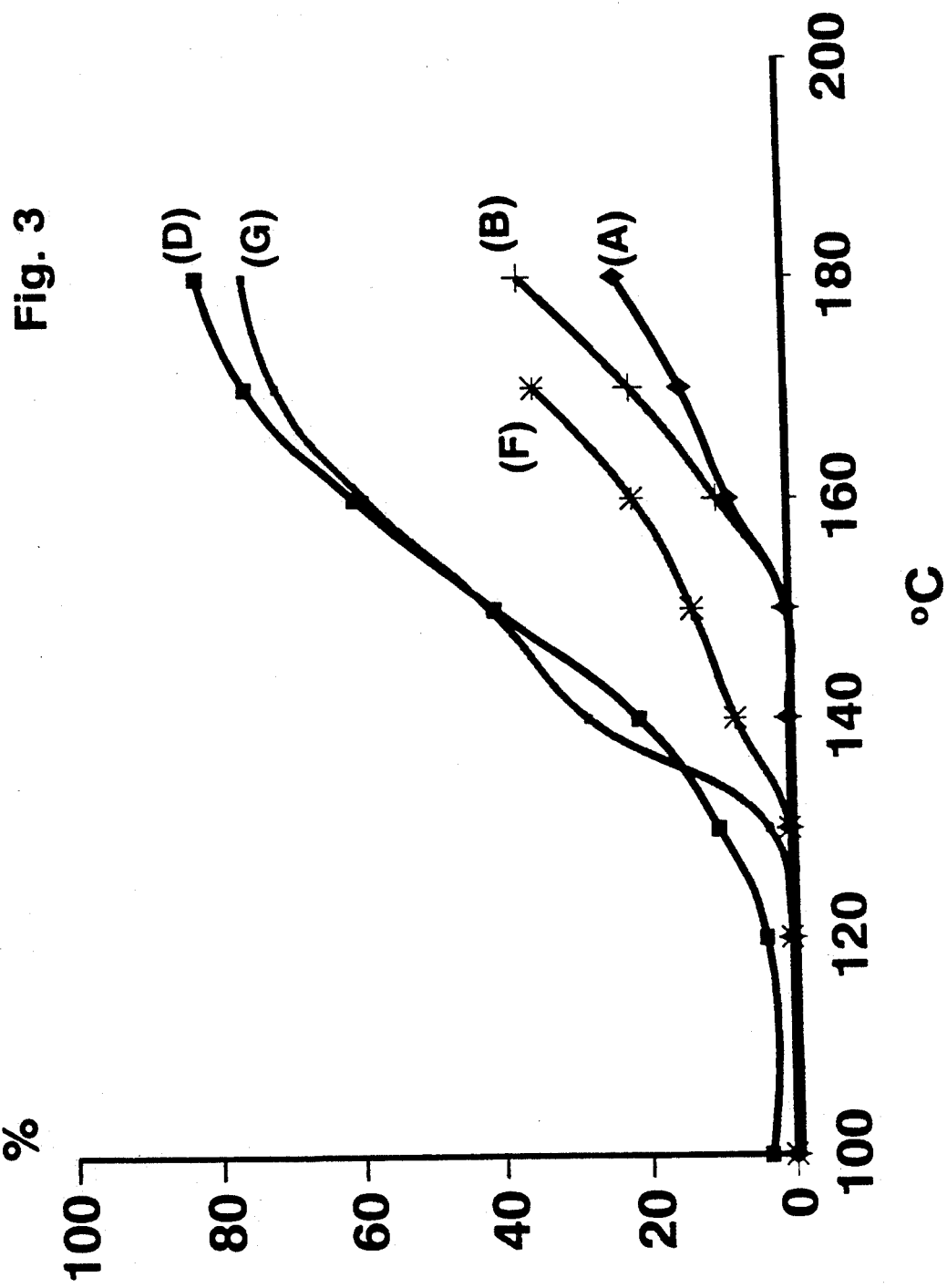

GROUP IVB OXIDE ADDITION TO NOBLE METAL ON RARE EARTH MODIFIED SILICA ALUMINA AS HYDROCARBON CONVERSION CATALYST

FIELD OF THE INVENTION

Applicants have discovered that the addition of Group IVB oxides to a catalyst comprising a rare earth oxide modified amorphous silica-alumina support and a metal(s) functionality affords a catalyst having enhanced metal(s) dispersion and activity which can function as a hydrocarbon conversion catalyst in reactions such as reforming and isomerization, especially wax isomerization. The present invention catalyst can be utilized as a hydrocarbon conversion catalyst in reforming reactions typically employing platinum on chlorided-alumina catalysts, thereby, removing the necessity of inconvenient, environmentally detrimental chlorine addition required during reforming over chlorided-alumina catalysts. Additionally, the catalysts provide permanent acidity, unlike chlorided-alumina catalysts whose acidity decreases as chlorine is depleted during use of the catalyst, thereby lowering activity and requiring continuous chlorine addition to maintain acidity and catalyst performance.

The present invention catalysts exhibit enhanced cyclohexene hydrogenation, and enhanced activity and aromatic selectivity during $C_7$ reforming, when compared to catalysts without the addition of Group IVB oxides. The present invention catalyst's $C_7$ isomerization selectivity is reduced and $C_5$- selectivity is only slightly increased.

SUMMARY

By this invention there is provided a catalyst composition comprising metal(s) selected from the group consisting of Group VIII noble metal(s), mixtures of Group VIII noble metal(s) and tin, mixtures of Group VIII noble metal(s) and rhenium, and mixtures of Group VIII noble metal(s), tin, and rhenium, a Group IVB oxide, and an amorphous silica-alumina support having dispersed thereon a rare earth oxide, which as herein used also includes yttrium oxide. The amorphous silica-alumina support contains at least about 50% silica by weight. As used herein, amorphous means noncrystalline, as indicated by the absence of sharp x-ray diffraction lines.

The invention is also directed to a method of using such catalysts in hydrocarbon conversion reactions such as reforming reactions and isomerization reactions, especially wax isomerization reactions.

BRIEF DESCRIPTION OF DRAWINGS

FIG. 3 shows % conversion of cyclohexene hydrogenated to cyclohexane of catalysts containing 0.3 wt % platinum and 0.9% Cl, a Pt silica-alumina catalyst containing 0.6 wt % platinum, a present invention catalyst having 0.3% Pt, 25% neodymium oxide, and 5% silica added, a rare earth modified Pt silica-alumina catalyst having 25 wt % neodymium oxide and 0.3 wt % platinum, and a rare earth modified Pt silica-alumina catalyst having 17% neodymium oxide and 0.3% platinum.

DETAILED DESCRIPTION OF INVENTION

Figure 1:
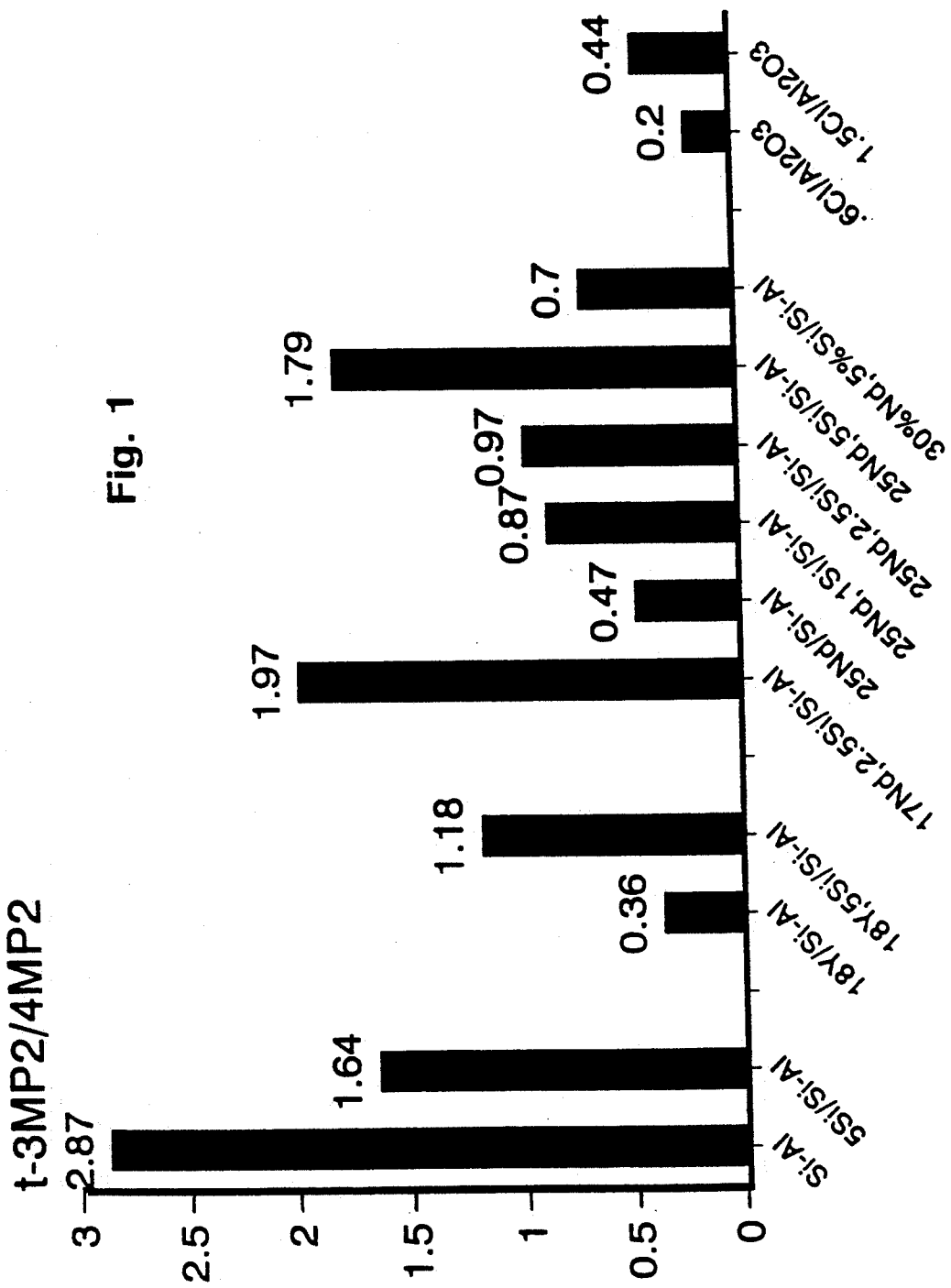
FIG. 1 compares the acidities of rare earth modified amorphous silica-alumina, Group IVB oxide additions to rare earth modified silica-alumina, silica-alumina, and chlorided-alumina catalysts. Catalyst comparison is accomplished by using the 2-methylpent-2-ene acidity probe test by measuring the ratio of 3-methylpent-2-ene to 4-methylpent-2-ene isomers.

The present invention utilizes a weakly basic rare earth oxide to systematically decrease the acidity of an amorphous silica-alumina support, hereinafter referred to as a singly modified support, to levels near those exhibited by halided-alumina catalysts. A Group IVB oxide is then added to the support, hereinafter referred to as a doubly modified support, to increase the dispersion of a metal, e.g. platinum, which is incorporated later. Thus, the doubly modified support, having platinum dispersed thereon, can function as a hydrocarbon conversion catalyst in reactions where platinum supported on halided-$Al_2O_3$ is used, for example, in reforming. Systematically as used herein means that the catalyst's acidity decreases proportionally to the amount of rare earth oxide added to the amorphous silica-alumina support.

The amorphous silica-alumina support of the present catalyst may be prepared by any of a number of conventional methods known to those skilled in the art. Alternatively, the amorphous silica-alumina support may be purchased from commercial sources. The support of the instant catalyst has a silica to alumina ratio of between about 95:5 & 50:50, preferably 75:25 $SiO_2:Al_2O_3$.

Prior to modification by addition of a rare earth oxide, the amorphous silica-alumina support is calcined in air at a temperature ranging from about 200° to about 600° C. The support is then impregnated with an aqueous solution of a rare earth salt which upon subsequent calcination is converted to a rare earth oxide. The rare earths are those elements of the periodic table having atomic numbers 57 to 71. Also included is yttrium, having an atomic number of 39, which behaves similar to rare earths in many applications. Suitable rare earths include, for example, neodymium, gadolinium and samarium with neodymium and yttrium being preferred. Mixtures of rare earth oxides may also be used. The amount of rare earth oxide impregnated onto the silica-alumina support ranges from about 1 wt % to about 90 wt %, preferably 10 wt % to about 25 wt %. Typically, the rare earth oxide is added to the support in the form of a hydrated salt, e.g. $Nd(NO_3)_3 \cdot 6H_2O$. The impregnation is accomplished via the incipient wetness technique, however, other techniques, such as ion exchange, chemical vapor deposition, or decomposition of organometallic compounds or other rare earth oxide precursors, known to those skilled in the art are also suitable. The impregnated support is then dried at about 100° to about 150° C. and calcined between about 300° and about 900° C., preferably about 400° to about 600° C. for about 1 to about 24 hours, preferably about 4 hours. Calcination converts the hydrated salt to the rare earth oxide.

Following the rare earth oxide modification, a Group IVB oxide is added to the support in amounts ranging from 0.1 to 15 wt %, preferably 1 to 10 wt %. The Group IVB oxide (Kirk-Othmer Encyclopedia of Chemical Technology, 2nd ed. 1965, V8, pg. 94) may be selected from, for example silica, germania, tin oxide and mixtures thereof. Preferably silica is used as the Group IVB oxide. The Group IVB oxide is typically incorporated into the singly modified amorphous silica-alumina support in the form of a water soluble salt or a Group IVB organic compound. For example, an ethanolic solution of tetraethoxysilane may be used. Following exposure to a wet atmosphere to hydrolyze the Group IVB compound, the support is then calcined to convert the Group IVB hydroxide compound, for example $Si(OH)_4$, to the oxide. At this point, the $SiO_2$—$Al_2O_3$ support, modified by both rare earth and Group IVB oxides, is referred to as doubly modified.

Metal(s) selected from the group consisting of Group VIII noble metal(s), mixtures of Group VIII noble metal(s) and rhenium, mixtures of Group VIII noble metal(s) and tin, and mixtures of Group VIII noble metal(s), tin, and rhenium, are then impregnated onto the doubly modified amorphous silica-alumina support to provide a hydrogenation-dehydrogenation function. Preferably Group VIII noble metal(s), most preferably platinum will be employed. The Group VIII noble metal(s) will be present on the catalyst in an amount from about 0.01 to about 10 wt %, calculated on an elemental basis, of the final catalyst composition. More preferably, the catalyst will contain from about 0.01 to about 2.0 wt %, most preferably about 0.3 to 0.6 wt % Group VIII noble metal(s). The catalyst of the present invention may also contain promoters or other metals that may be used in conjunction with, e.g. platinum, in reforming or isomerization, especially wax isomerization, such as iridium, rhenium, palladium, ruthenium, rhodium and mixtures thereof in concentrations ranging from about 0.01 to 10 wt %, preferably from about 0.01 to 2.0 wt %, more preferably from about 0.3 to 0.6 wt %. When Group VIII noble metal(s) are employed, tin may also be present, alone or in conjunction with rhenium, in concentrations ranging from about 0.01 to 10 wt %, preferably from about 0.01 to 2.0 wt %, more preferably from about 0.3 to 0.6 wt %. Preferably tin will be present with platinum.

The metals can be incorporated onto the doubly modified support via the incipient wetness technique, or other suitable technique known to those skilled in the art. An absorption technique from a dilute or concentrated solution or evaporation may also be used. The solution used in impregnating the catalyst e.g. can be a neutral salt or acid solution having the respective Group VIII noble metal(s), and mixtures of Group VIII noble metal(s) and rhenium and/or tin dissolved therein. The impregnation can be carried out under a variety of conditions known to those skilled in the art including ambient and elevated temperatures, and atmospheric and superatmospheric conditions.

The catalyst after impregnation of the Group VIII noble metal or mixtures of Group VIII noble metal(s) and tin and/or rhenium, is dried by heating at a temperature above about 27° C., preferably between about 65° C. and 150° C., in the presence of nitrogen, oxygen, or both, in an air stream or under vacuum. It is then calcined at a temperature from about 300° C. to 650° C., preferably 400° C. to 560° C., in the presence of nitrogen or oxygen in an air stream, or in the presence of an inert gas or a mixture of oxygen and an inert gas. This calcination, or activation, is conducted for periods ranging from about 1 to about 24 hours in either flowing or static gases.

The catalyst of the present invention can be contacted with a feedstream comprising $C_5+$. When utilized in a reforming process the feedstream will preferably by $C_5$ to C 232° C. hydrocarbons, in an isomerization reaction using a liquid feedstream, the feedstream will preferably be normal $C_5$ to $C_8$ paraffins. When a wax isomerization reaction is performed, the feed will preferably be $C_{12}+$ hydrocarbons.

In a catalytic reforming process, a hydrotreated (low wt % sulfur) naphtha stream comprising $C_5+$, preferably $C_5$ to C 232° C. hydrocarbons, that typically contains about 20–80 volume % paraffins, 20–80 volume % naphthenes, and about 5–20 volume % aromatics, and boiling at atmospheric pressure between about 27° and 232° C., preferably between about 66° and 191° C., is brought into contact with the catalyst system of the present invention in the presence of hydrogen. The reaction typically takes place in the vapor phase at a temperature ranging from about 350° to 550° C., preferably about 400° to 530° C. Reaction zone pressures may range from about 1 to 50 atmospheres, preferably from about 3 to 25 atmospheres.

The naphtha feedstream is generally passed over the catalyst at space velocities ranging from about 0.5 to 20 parts by weight of naphtha per hour per part by weight of catalyst (w/w/hr), preferably from about 1 to 10 w/w/hr. The hydrogen to hydrocarbon mole ratio within the reaction zone is maintained between about 0.5 and 20, preferably between 1 and 10. During the reforming process, the hydrogen employed can be in admixture with light paraffinic gaseous hydrocarbons. Since the hydroforming process produces large quantities of hydrogen, a recycle stream is employed for admission of hydrogen with the feed.

The wax which may be isomerized using the catalyst of the present invention is any readily available natural or synthetic wax. Natural waxes include those waxes obtained by dewaxing natural hydrocarbons, commonly called slack waxes. Slack waxes may contain up to 40% of a liquid hydrocarbon phase admixed with the wax.

Slack waxes, coming from natural petroleum sources, contain numerous molecular species such as heteroatom compounds and polynuclear aromatic materials which are detrimental to the life and activity of isomerization catalysts. Thus, the heteroatoms should be removed prior to isomerization using a hydrotreating catalyst under mild hydrotreating conditions. Exemplary of hydrotreating catalysts are Ni/Mo on alumina and Co/Mo on alumina. Hydrotreating conditions are 250° C.–400° C.; 0.1–10 LHSV; 500 to 3,000 psi $H_2$; 500–2,000 SCF $H_2$/bbl. Following hydrotreating, acceptable levels will be a nitrogen content of about 1–5 ppm, preferably 2 ppm and less and a sulfur content of about 1–20 ppm, preferably 5 ppm and less.

Waxes which may be isomerized using the catalyst of the present invention also include Fischer-Tropsch Wax. Fischer-Tropsch Wax may be made from natural gas. Under known conditions, natural gas is converted to synthesis gas ($CO+H_2$) which may then be converted by the Fischer-Tropsch process to gaseous and liquid hydrocarbons and a normally solid paraffin wax, known as Fischer-Tropsch Wax. This wax does not contain the sulfur, nitrogen, or metal impurities normally found in naturally occurring oil, but it is known to contain water and a number of oxygenate compounds such as alcohols, ketones, aldehydes, etc. Hydrotreating to remove oxygenates and reduce olefin concentration may be desirable.

Isomerization, especially wax isomerization, over the catalyst of the present invention can be conducted at a temperature of 250° to 400° C., 100 to 3,000 psi $H_2$; 500 to 10,000 SCF/bbl, $H_2$, and 0.1 to 10.0 LHSV, preferably 300° to 400° C., 1,000 to 1,500 psi $H_2$, and 1 to 2 V/V/hr.

The following examples are illustrative of the invention though not limiting.

EXAMPLE 1

The catalysts of the instant invention were prepared by first calcining an amorphous silica-alumina support containing 75% silica and 25% alumina at 600° C. overnight. Various amounts of $Nd(NO_3)_3 \cdot 6H_2O$ or $Y(NO_3)_3 \cdot 6H_2O$, as indicated in Table 1, were added to 9 cc of water and impregnated onto 14 grams of the calcined amorphous silica-alumina support via the incipient wetness technique to obtain the compositions shown in Table 1.

TABLE 1

| Grams | | % Rare Earth Oxide On |
|---|---|---|
| $Nd(NO_3)_3 \cdot 6H_2O$ | $Y(NO_3)_3 \cdot 6H_2O$ | Amorphous Silica-Alumina |
| 7.5 | — | 17% $Nd_2O_3$ |
| 12.2 | — | 25% $Nd_2O_3$ |
| 15.6 | — | 30% $Nd_2O_3$ |
| — | 10.6 | 18% $Y_2O_3$ |

The impregnated supports were dried overnight at 110° C. and then calcined at 500° C., for 3 hours.

Each of the above singly modified supports was then impregnated with silica in the following manner. The weight of tetraethoxysilane indicated in Table 2, to prepare different weight loadings of silica, was diluted to a total volume of 5 cc with ethanol and impregnated via the incipient wetness technique onto 9.5 grams of the above singly modified amorphous silica-alumina supports. The supports were then placed along with a vessel of water into a sealed container for 48 hours, to create a high relative humidity to hydrolyze the tetraethoxysilane to $Si(OH)_4$. The supports were then calcined at 500° C. for 3 hours.

TABLE 2

| Grams Tetraethoxysilane | % Silica Impregnated |
|---|---|
| 0.32 | 1 |
| 0.84 | 2.5 |
| 1.73 | 5 |

Table 3 shows the % of the rare earth oxide, as well as the % silica contained in the doubly modified amorphous silica-alumina supports.

TABLE 3

| Wt % $Nd_2O_3$ | Wt % $Y_2O_3$ | Wt % $SiO_2$ |
|---|---|---|
| 17 | — | 2.5 |
| 25 | — | 1 |
| 25 | — | 2.5 |
| 25 | — | 5 |

TABLE 3-continued

| Wt % $Nd_2O_3$ | Wt % $Y_2O_3$ | Wt % $SiO_2$ |
|---|---|---|
| 30 | — | 5 |
| — | 18 | 1 |
| — | 18 | 5 |

Platinum was then impregnated onto selected doubly modified supports. 4.985 grams of each support selected was impregnated via the incipient wetness technique with 2.5 cc of an aqueous chloroplatinic acid solution containing 0.015 g of platinum followed by drying at 110° C. overnight and air calcination at 450° C. for three hours.

Each catalyst support impregnated with platinum contained 0.3 wt % platinum. Additionally, a portion of calcined amorphous silica-alumina was impregnated with 0.6% platinum via the above technique. Chlorided alumina supports having 0.6%, 0.9%, 1.2%, and 1.5% chloride were prepared and used for comparison. The chlorided-alumina sample containing 0.9% chloride was also impregnated with 0.3% platinum and used for comparison in reforming reactions.

Prior to incorporating platinum, several supports prepared in accordance with the above methods were compared for acidity using the 2-methylpent-2-ene (2MP2) acidity probe test. Additionally, one support containing only 5% added silica (no rare earth oxide added) was prepared by omitting the rare earth oxide addition step. Also compared were the chlorided-alumina samples.

The formation rates and rate ratios of various hexane products can be used to estimate both acid site concentrations and acid site strengths. The product hexane isomers formed include 4-methylpent-2-ene (4MP2), t-3-methylpent-2-ene (t-3MP2), and 2,3 dimethylbute-2-ene (2,3 DMB2). 4MP2 requires only a double bond shift, a reaction occurring on weak acid sites. 3MP2 involving a methyl group shift required stronger acidity than the double bond shift, and 2,3 DMB2 requires even stronger acidity to create a second methyl branch. For a homologous series of solid acids, differences in t-3MP2 rates normalized with respect to surface area reflect the density of acid sites possessing strengths sufficient to catalyze the skeletal isomerization. Since skeletal isomerization rates generally increase with increasing acid strength, the ratio of methyl group migration rate to double bond shift rate should increase with increasing acid strength. The use of rate ratios, in lieu of individual conversion rates is preferable since differences in acid site populations are normalized.

The % conversion of 2-methylpent-2ene as well as the ratios of t-3MP2/4MP2, 2,3 DMB2/4MP2, and % $C_5$- selectivity were determined. The catalysts were reduced for 1 hour at 500° C. prior to the run. The runs were conducted at 2.5 w/w/hr and 15 psia. The following data, in Table 4, was obtained after 1 hour on feed. The numbers appearing before the Nd, Y or Si indicate the wt % of that oxide present. The metal symbol was used as a shorthand, however, it is understood that it is the oxide that is present. The silica-alumina support was also designated in this fashion as Si-Al. For example, 25Nd/1Si/Si-Al represents an amorphous silica-alumina (Si-Al) support having 25 wt % neodymium oxide (25Nd) dispersed thereon, and additionally having 1 wt % silica (1Si) added.

TABLE 4

| Catalyst | % Conversion | t-3MP2/ 4MP2 | 2,3DMB2/ 4MP2 | % C5- |
| --- | --- | --- | --- | --- |
| Si—Al | 75 | 2.87 | 0.69 | 1.73 |
| 25Nd/Si—Al | 47 | 0.47 | 0.055 | 0.17 |
| 25Nd/1Si/Si—Al | 53 | 0.87 | 0.094 | 0.40 |
| 25Nd/2.5Si/Si—Al | 55 | 0.97 | 0.11 | 0.51 |
| 25Nd/5Si/Si—Al | 67 | 1.79 | 0.21 | 1.07 |
| 17Nd/2.5Si/Si—Al | 67 | 1.97 | 0.26 | 1.17 |
| 30Nd/5Si/Si—Al | 50 | 0.70 | 0.70 | 0.40 |
| 18Y/Si—Al | 43 | 0.36 | 0.048 | 0.102 |
| 18Y/5Si/Si—Al | 69 | 1.18 | 0.14 | 1.17 |
| 5Si/Si—Al | 64 | 1.64 | 0.20 | 1.15 |
| 0.6Cl/Al | 29 | 0.2 | 0.084 | 0.026 |
| 0.9Cl/Al | 30 | 0.22 | 0.078 | 0.020 |
| 1.2Cl/Al | 32 | 0.29 | 0.10 | 0.027 |
| 1.5Cl/Al | 36 | 0.44 | 0.15 | 0.045 |

FIG. 1 graphically depicts the results obtained from the catalyst supports of Example 1 prior to platinum incorporation when employed in the 2MP2 acidity probe test. The ratio of t-3MP2/4MP2 is shown. The results show that rare earth addition to amorphous silica-alumina systematically lowers acidity, further addition of Group IVB oxide, e.g. silica, increases the acidity. However, the addition of silica to the rare earth oxide modified support surprisingly behaves different than addition of silica to an unmodified silica-alumina support.

EXAMPLE 2

Figure 2:
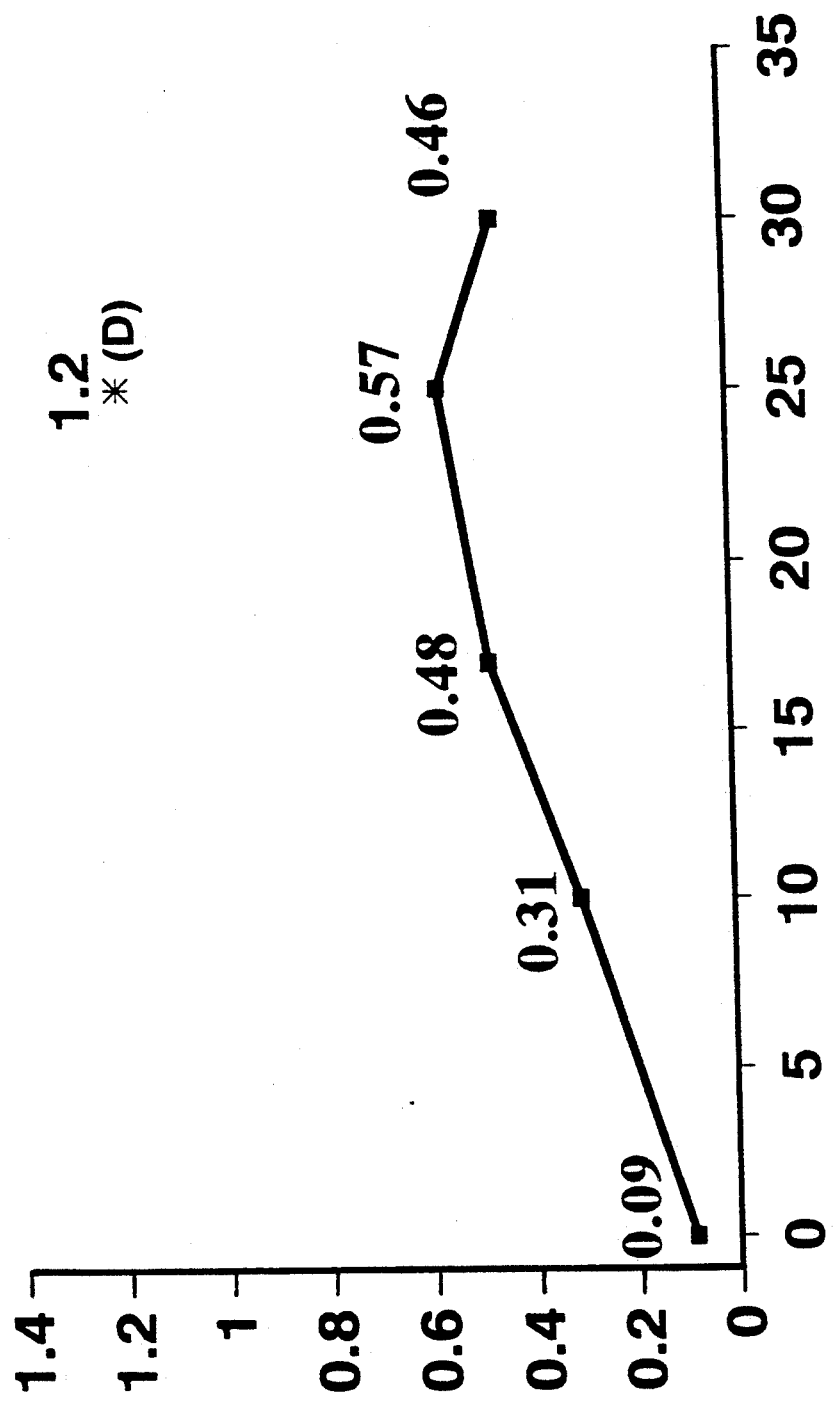
FIG. 2 depicts the enhancement of platinum dispersion afforded by Group IVB oxide containing rare earth modified amorphous silica-alumina by measuring the number of H atoms chemisorbed per Pt metal atom (H/M) using $H_2$ chemisorption techniques.

Catalysts prepared in the manner described in Example 1 containing 0.3 wt % platinum and having 0, 10, 17, 20 and 25 wt % neodymium oxide, prepared by using 0, 4.1, 7.5, 9.1, and 12.2 g of $Nd(NO_3)_3 \cdot 6H_2O$ per 9 cc of water respectively impregnated on 14 gm of $SiO_2$—$Al_2O_3$, were compared to the catalyst of Example 1 having 0.3 wt % platinum, 25 wt % neodymium oxide and 5 wt % silica added hereinafter designated (D) in FIG. 2. The catalysts were calcined at 500° C. prior to platinum impregnation and then impregnated with 0.3 wt % platinum by chloroplatinic acid, calcined at 450° C., and then reduced at 450° C. The platinum dispersion was measured by $H_2$ chemisorption and the weak adsorption as determined from the backsorption was subtracted from the total adsorption to give values indicative of only the strongly chemisorbed sites. The results are shown in FIG. 2. The Y axis shows the H/M chemisorption after 45° C. calcination and reduction. The X axis shows the % neodymium oxide incorporated into the amorphous silica-alumina.

The results demonstrate that addition of 5 wt % silica dramatically enhances platinum dispersion on a rare earth oxide modified amorphous silica-alumina catalyst.

EXAMPLE 3

The catalysts prepared in accordance with Example I were tested for conversion of cyclohexene to cyclohexane. This test was performed to monitor the dispersion of the platinum in a hydrogenation reaction which primarily depends on the metal activity or dispersion. The following catalysts were employed: 0.3 wt % Pt on 17 wt % $Nd_2O_3$ modified $SiO_2$—$Al_2O_3$ hereinafter referred to as catalyst (A), 0.3 wt % Pt on 25 wt % $Nd_2O_3$ modified $SiO_2$—$Al_2O_3$ hereinafter referred to as catalyst (B), 0.3 wt % Pt on 25 wt % $Nd_2O_3$ modified $SiO_2$—$Al_2O_3$ having 5 wt % silica added hereinafter referred to as catalyst (D), 0.6 wt % Pt on $SiO_2$—$Al_2O_3$ hereinafter referred to as catalyst (F) and 0.3 wt % Pt on 0.9 wt % chlorided $Al_2O_3$ hereinafter referred to as catalyst (G).

Catalysts (D) and (G) Were more active at a given temperature than catalysts (A), (B) and (F) indicating that the catalysts having added Group IVB oxide, which showed higher platinum dispersion in Example 2, also exhibit increased reactivity for cyclohexene hydrogenation compared with rare-earth modified catalysts without added silica. Furthermore, catalyst (D)'s activity was very close to that of catalyst (G), the platinum chlorided alumina catalyst, confirming the dispersion measurements.

The above results are more easily analyzed by reference to FIG. 3 which shows the % conversion to cyclohexane at different temperatures. The curves designate the catalyst as indicated by the letters. The Y axis represents % conversion to cyclohexane and the X axis temperature in degrees C.

EXAMPLE 4

The catalysts of Example 1 were compared in a reforming process at 160 psi, WHSV=12, and $H_2/nC_7=6$: present invention catalyst having 5 wt % silica added (D), the chlorided alumina catalyst having 0.3 wt % platinum and 0.9 wt % Cl. (G), the platinum silica-alumina catalyst having 0.6% platinum (F), the 25 wt % neodymium oxide modified silica-alumina containing 0.3 wt % platinum (B), and the 17 wt % neodymium oxide modified silica alumina containing 0.3 wt % platinum (A) were compared. The reaction was conducted, over a 50 hour period, in a fixed bed reactor equipped with a gas chromatograph.

Figure 4A:
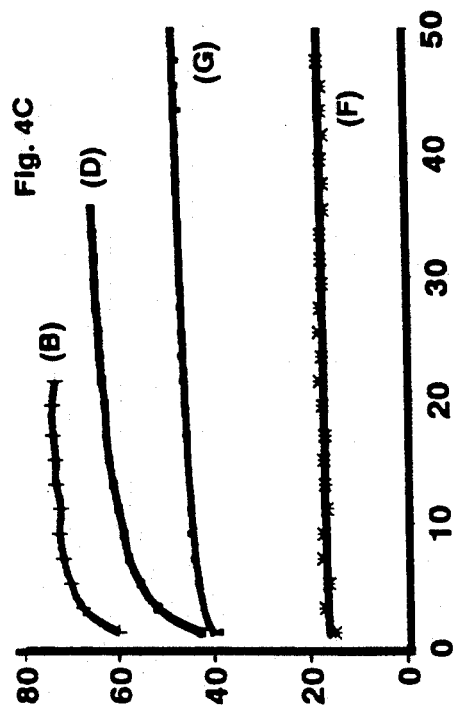
FIG. 4A, 4B, 4C, and 4D compare a platinum chlorided-alumina catalyst containing 0.3 wt % platinum and 0.9% Cl, a Pt silica-alumina catalyst containing 0.6 wt % platinum, a present invention catalyst having 0.3% Pt, 25% neodymium oxide, and 5% silica added, and a rare earth modified Pt silica-alumina catalyst having 25 wt % neodymium oxide and 0.3 wt % platinum. The catalysts are compared for n-$C_7$ conversion, aromatics selectivity, $C_7$ isomer selectivity, and $C_5$- selectivity respectively, in a n$C_7$ reforming process.
Figure 4C:
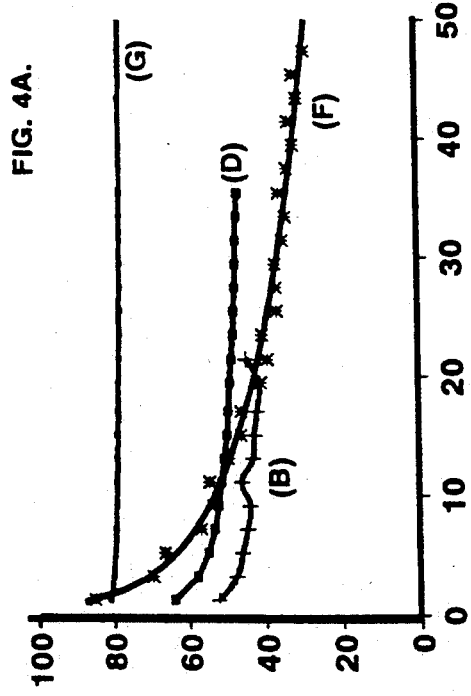

The $n-C_7$ activity of the catalysts was compared. The platinum on chlorided alumina (G) showed about 80% conversion over a period of 50 hours. The Pt on Si-Al catalyst (F) exhibited about an 85% conversion initially, but dropped off after about 8 hours stabilizing around 30 to 40% after about 20 hours and continuing for the entirety of the run. The present invention catalyst having 5 wt % silica added (D) showed about 65% conversion initially and dropped off, stabilizing at about 55% for the entirety of the run. The 25 wt % neodymium oxide-modified catalyst having 0.3 wt % platinum (B) was only run for 20 hours and showed about 42-50% conversion for that time. FIG. 4A shows these results. Each curve is designated by the letter of the catalyst it represents. From the figure it is evident that the present invention catalyst shows higher stability than the platinum silica-alumina catalyst (F). The present invention catalyst performance is closer to that of the platinum chlorided-alumina catalyst (G) than the same catalyst without Group IVB oxide addition (B). The Y axis in the figure is $nC_7$ conversion, the X axis time in hours.

The catalysts of Example 4 were compared for aromatics (benzene and toluene) wt % selectivity over a 50 hour period with the following results:

The platinum on chlorided alumina catalyst (G) showed a % selectivity of about 38% initially and dropped off at about 3 hours stabilizing at about 25%–20% over the remainder of 50 hour run. The present invention catalyst having 5 wt % silica added, catalyst (D), began at about 24% selectivity at about 3 hours, and stabilized at about 18% for the remainder of the run. The 25 wt % neodymium oxide modified silica-alumina catalyst (B) began at about 18% stabilizing at about 9 to 10% selectivity up to about 20 hours when the run was terminated. The platinum on silica-alumina catalyst (F) began at about 8%, stabilizing at about 4% for the remainder of the run. The results are graphically depicted in FIG. 4 View B. The letters designated indicate which particular catalyst the line represents. The results indicate that catalyst (D) is improved over catalyst (B) as a result of silica addition.

Figure 4B:
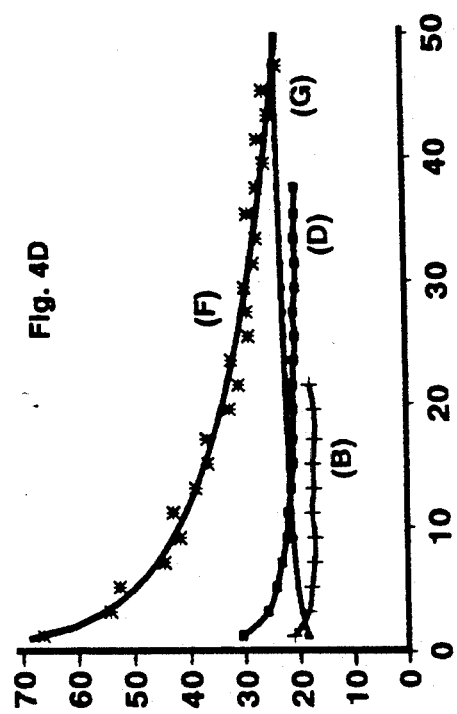
Figure 4D:
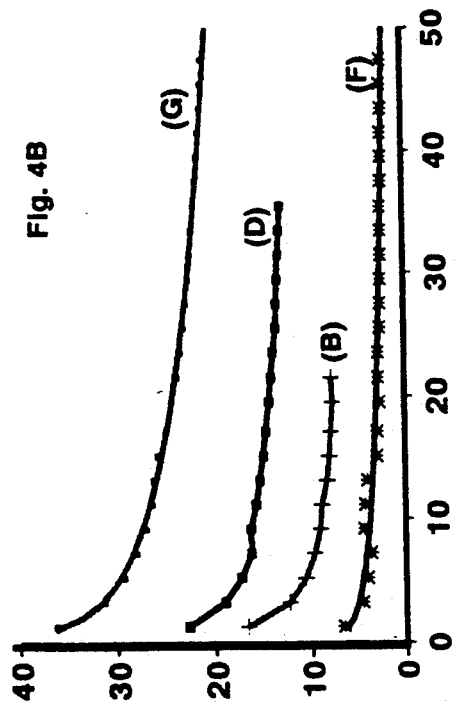

The results shown in FIG. 4B indicate that catalyst (D) is improved over catalyst (B) as a result of silica addition. The Y axis is aromatization selectivity and the X axis time in hours.

The catalysts were also compared over the 50 hour period for $C_7$ isomerization selectivity with the following results:

The catalyst of the present invention (D) began at about 43% and rose to about 63%, remaining there for the entire run. The rare-earth oxide modified catalyst (B) began at about 60% rising to about 70% for its entire run of 20 hours. The platinum on chlorided catalyst (G) showed a steady C7 isomer selectivity of about 43%. The Pt/Si-Al catalyst (F) showed about 18% selectivity. The results are graphically depicted in FIG. 4C. The lines represent the catalysts as noted by the letters designated.

The figures Y axis shows $C_7$ isomerization selectivity and the X axis is time in hours. Comparison of Views B and C of FIG. 4 show that the decreased isomerization selectivity of catalyst (D) has resulted in increased aromatics.

The catalysts were also compared for $C_5-$ selectivity. The present invention catalyst (D) showed about 30% selectivity initially, stabilizing at about 20%. Catalyst (G), Pt on chlorided alumina, began at about 20% and rose to about 25%. The Pt on silica alumina catalyst (F) began at about 68% and dropped to between 25-30% for the remainder of the run at about 20 hours. The rare earth oxide modified catalyst (B) began at about 22% and thereafter remained at about 18% for the remainder of its 20 hour run.

The results demonstrate that the catalysts of the present invention are stable, affording better aromatic selectivity and lower cracking than Pt on Si-Al catalysts (F), but have a somewhat lower activity than chlorided catalysts (G). However, the activity is increased over that of the same catalyst without the oxide addition (B) and the aromatics selectivity increases substantially.

The present invention catalyst (D) reduced cracking relative to Pt on Si-Al (F). The results are graphically depicted in FIG. 4D. The lines represent the catalysts as noted by the letters. The Y axis shows $C_5-$ selectivity and the X axis time in hours.

What is claimed is:

1. A catalyst composition comprising metal(s) selected from the group consisting of Group VIII noble metal(s), mixtures of Group VIII noble metal(s) and rhenium, mixtures of Group VIII noble metal(s) and tin, and mixtures of Group VIII noble metal(s), tin and rhenium, a Group IVB oxide, and an amorphous silica-alumina support having at least about 50 wt % silica, having dispersed thereon a rare earth oxide.

2. A catalyst composition according to claim 1 wherein said Group IVB oxide is present in an amount of about 0.1 to about 15 weight percent.

3. A catalyst composition according to claim 1 wherein said Group IVB oxide is selected from the group consisting of silica, germania, tin oxide and mixtures thereof.

4. A catalyst composition according to claim 2 wherein said Group IVB oxide is preferably silica.

5. A catalyst composition according to claim 1 wherein said Group VIII noble metal is present in an amount of about 0.01 to about 10 weight percent.

6. A catalyst composition according to claim 1 wherein said silica-alumina support has a ratio of silica:alumina of about 50:50 to about 95:5.

7. A catalyst composition according to claim 1 wherein said Group VIII noble metal is selected from the group consisting of platinum, iridium, rhodium, palladium, ruthenium and mixtures thereof.

8. A catalyst composition according to claim 1 wherein said Group VIII noble metal is platinum.

9. A catalyst composition according to claim 1 wherein said rare earth oxide is present in an amount between about 1 wt % and 90 wt %.

10. A catalyst composition according to claim 1 wherein said rare earth oxide is selected from the group consisting of oxides of the elements of the periodic table having atomic numbers from 57 through 71 and 39.

* * * * *